United States Patent
Suffner

(10) Patent No.: US 9,206,076 B2
(45) Date of Patent: Dec. 8, 2015

(54) VITREOUS OR PARTIALLY CRYSTALLINE JOINING MATERIAL AND USES OF SAME

(71) Applicant: SCHOTT AG, Mainz (DE)

(72) Inventor: Jens Suffner, Landshut (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 14/230,317

(22) Filed: Mar. 31, 2014

(65) Prior Publication Data

US 2014/0356046 A1  Dec. 4, 2014

(30) Foreign Application Priority Data

May 28, 2013  (DE) .................. 10 2013 209 970

(51) Int. Cl.

| | | |
|---|---|---|
| *C03C 8/02* | (2006.01) | |
| *C03C 8/24* | (2006.01) | |
| *C04B 37/00* | (2006.01) | |
| *C04B 37/02* | (2006.01) | |
| *C03C 3/068* | (2006.01) | |
| *C03C 3/095* | (2006.01) | |
| *C03C 8/20* | (2006.01) | |
| *H01M 8/02* | (2006.01) | |
| *C03C 8/04* | (2006.01) | |

(52) U.S. Cl.
CPC . *C03C 8/24* (2013.01); *C03C 3/068* (2013.01); *C03C 3/095* (2013.01); *C03C 8/02* (2013.01); *C03C 8/04* (2013.01); *C03C 8/20* (2013.01); *C04B 37/005* (2013.01); *C04B 37/025* (2013.01); *H01M 8/0282* (2013.01); *C04B 2237/10* (2013.01); *C04B 2237/32* (2013.01); *C04B 2237/403* (2013.01); *C04B 2237/406* (2013.01); *Y10T 403/21* (2015.01)

(58) Field of Classification Search
CPC ............. C03C 8/02; C03C 8/14; C03C 8/16; C03C 8/24
USPC .......................................... 501/14, 15, 17, 21
See application file for complete search history.

(56) References Cited

U.S. PATENT DOCUMENTS

| | | | |
|---|---|---|---|
| 4,418,985 A | 12/1983 | Kasori et al. | |
| 5,998,037 A | 12/1999 | Sridharan et al. | |
| 6,124,224 A * | 9/2000 | Sridharan et al. ............... | 501/15 |
| 6,532,769 B1 | 3/2003 | Meinhardt et al. | |
| 8,012,895 B2 * | 9/2011 | Wu et al. .......................... | 501/67 |
| 8,658,549 B2 | 2/2014 | Goedeke et al. | |
| 8,664,134 B2 | 3/2014 | Goedeke et al. | |
| 8,741,792 B2 | 6/2014 | Akamatsu et al. | |
| 9,133,053 B2 | 9/2015 | Goedeke et al. | |
| 2002/0019304 A1* | 2/2002 | Kishida et al. .................. | 501/32 |
| 2006/0063659 A1 | 3/2006 | Xue et al. | |
| 2009/0061282 A1* | 3/2009 | Wu et al. .......................... | 429/36 |
| 2011/0129752 A1* | 6/2011 | Claassen ........................ | 429/434 |
| 2011/0312482 A1 | 12/2011 | Goedeke et al. | |
| 2012/0183785 A1 | 7/2012 | Schirrmeister et al. | |

FOREIGN PATENT DOCUMENTS

| | | |
|---|---|---|
| DE | 101 22 327 | 11/2002 |
| DE | 10 2009 011 182 | 9/2010 |
| DE | 10 2009 038 812 | 3/2011 |
| DE | 10 2010 035 251 | 9/2011 |
| DE | 10 2011 080 352 | 2/2013 |
| JP | 57-200247 | 12/1982 |
| JP | 2003-212646 | 7/2003 |
| JP | 2009-046380 | 3/2009 |
| JP | 2011-68507 | 4/2011 |
| JP | 2011-168480 | 9/2011 |
| JP | 2012-162445 | 8/2012 |
| JP | 2012-519149 | 8/2012 |
| WO | WO02/094727 | 11/2002 |
| WO | WO 2010/099939 | 9/2010 |
| WO | WO2011/105519 | 9/2011 |

* cited by examiner

*Primary Examiner* — Noah Wiese
(74) *Attorney, Agent, or Firm* — Michael J. Striker

(57) ABSTRACT

The amorphous or partially crystalline, glass-based joining material is suitable for high-temperature applications, particularly in fuel cells and/or sensors. In addition to $SiO_2$ and $B_2O_3$ as glass formers, the joining material similarly contains BaO and CaO, whereby the amount of $Al_2O_3$ is limited. The joining material has a coefficient of linear thermal expansion of at least $7.0 \cdot 10^{-6}$ $K^{-1}$ in a range of 20° C. to 300° C. The joining material can be used for joining ferritic high-grade steels and/or chromium-containing alloys and/or ceramics, such as stabilized zirconium oxide and/or aluminium oxide.

16 Claims, No Drawings

VITREOUS OR PARTIALLY CRYSTALLINE JOINING MATERIAL AND USES OF SAME

CROSS-REFERENCE

The invention described and claimed herein below is also described in German Patent Application 10 2013 209 970.3, filed May 28, 2013 in Germany. The aforesaid German Patent Application, whose subject matter is incorporated herein by reference thereto, provides the basis for a claim of priority of invention for the invention claimed herein below under 35 U.S.C. 119(a)-(d).

BACKGROUND OF THE INVENTION

1. The Field of the Invention

The present invention relates to glass-based joining materials, in particular amorphous or partially crystallizing joining materials with and without a filler material, which are generally also referred to as glass solders, and are suitable in particular for high-temperature applications, and to the uses thereof.

2. Description of the Related Art

Joining materials of this type are commonly used to produce joint connections, in particular to join ceramic components to one another or to join metal components in an electrically insulating manner. In the development of such joining materials, their compositions are often selected so that their respective coefficients of thermal expansion correspond approximately to those of the components to be joined therewith, in order to obtain permanently stable joint connections. Compared to other joint connections, for example those made of plastic, those based on glass have the advantage that they are configured to be hermetically tight and can withstand higher temperatures.

Such glass-based joining materials of the generic type are generally often produced from a glass powder which is melted in the soldering operation and, under the action of heat, gives rise to the joint connection with the components to be joined. The soldering temperature is generally selected so as to correspond approximately to what is termed the hemisphere temperature of the glass, or can differ therefrom usually by ±20 K. The hemisphere temperature can be determined in a microscopy process with a hot-stage microscope. It denotes the temperature at which an originally cylindrical sample has amalgamated to form a hemispherical mass. The hemisphere temperature can be assigned a viscosity of approximately log η=4.6, as can be gathered from appropriate specialist literature. If a crystallization-free joining material in the form of a glass powder is melted and cooled again so that it solidifies, it can usually also be melted again at the same melting temperature. For a joint connection with a crystallization-free glass solder as the joining material, this means that the operating temperature to which the joint connection can be subjected in the long term must not be higher than the soldering temperature. In actual fact, the operating temperature in many applications has to be significantly below the soldering temperature, since the viscosity of the glass solder decreases with increasing temperatures and a glass having a certain degree of flowability can be pressed out of the joint connection at high temperatures and/or pressures, and therefore the joint connection can fail in its function. For this reason, glass-based joining materials suitable for high-temperature applications usually must to have a soldering temperature or hemisphere temperature is which is significantly above the later operating temperature, and/or they must crystallize sufficiently, such that the crystallization ensures an adequate stability of the solder during operation at elevated temperatures.

One field of use of such joining materials is, for example, that of joint connections in high-temperature fuel cells, which can be used, for example, as a power source in motor vehicles or for localized power supply. An important type of fuel cell is, for example, what is termed an SOFC (Solid Oxide Fuel Cell), which can have very high operating temperatures of up to approximately 1100° C. The joint connection is in this case commonly used for producing fuel cell stacks, i.e. for joining a plurality of individual fuel cells to form a stack. Fuel cells of this type are already known and are continuously being improved. In particular, the trend in present-day fuel cell development is generally towards lower operating temperatures. Some fuel cells already achieve operating temperatures of below 800° C., and therefore a reduction in the soldering temperatures is possible and also desirable on account of the resultant low thermal loading of the SOFC components during the soldering process.

A suitable metal for producing SOFCs, in particular interconnectors, are, for example, chromium-containing alloys, such as CFY (chromium-iron-yttrium, Cr5FeY), which is sold by Plansee as a chromium-based alloy having an iron proportion of 5% and small quantities of yttrium oxide. Glass-based joining materials used, for example, in SOFCs must be compatible with the materials used there for the joining partners, i.e. for example with CFY.

DE 10 2009 038 812 A1 describes crystallizing glass solders which can withstand high temperatures and which contain up to 40 mol % BaO and only very small amounts, of 0-2 mol % CaO. These materials are difficult to process; it has not been possible to produce reliable joint connections, particularly for SOFC applications, using these.

Alkaline earth metal aluminosilicate glasses are described in patent specification U.S. Pat. No. 6,532,769 B1. However, they have an unfavourably high content of BaO and $Al_2O_3$, which leads to the formation of polymorphic celsian phases.

DE 10 2011 080 352 A1 describes soldering glasses for use at high temperatures, which are based on alkaline earth metal aluminosilicates and have a high CaO content. On account of their very low $SiO_2$ content, their flow properties before crystallization are greatly reduced.

U.S. Pat. No. 5,998,037 A describes porcelain enamel based on BaO, $B_2O_3$ and $SiO_2$ for electronic applications. The glasses described do not contain any CaO, however, and preferably have a small $SiO_2$ content and a high $B_2O_3$ content. In addition, they can also contain further oxides of alkali metals, fluorine, phosphorus oxide or else polyvalent oxides such as $Co_3O_4$, which are all disadvantageous for the resistance of the glass, e.g. under stack-related conditions of an SOFC (high temperatures and also humid and reducing gases).

U.S. Pat. No. 6,124,224 A describes glass-ceramic joining material for use in the high-temperature range in particular for producing hermetic joints for sensors in the exhaust-gas field. The glasses described in this document have relatively high $Al_2O_3$ contents, which, on account of the possible formation of monocelsians and cordierite, are disadvantageous in the case of high operating temperatures and operating times.

DE 10 2009 011 182 A1 relates to soldering glasses with crystallization properties, the total BaO and alkaline earth metal content of which is very high. High contents of barium in combination with chromium in the high-grade steels or chromium alloys commonly used lead to the strong formation of an anisotropic barium chromate phase mismatched in terms of expansion at the interface, which is observed as a reduced cycle resistance.

BRIEF SUMMARY OF THE INVENTION

Against this background, the present invention is based on the object of providing a glass-based joining material which is suitable for high-temperature applications, in particular in the temperature range of more than 800° C., but has improved flowability in the initial state, such that the production of components containing a joint connection with the joining material is simplified. The coefficient of linear thermal expansion in the temperature range of 20° C. to 300° C., which is symbolized as $\alpha_{(20\text{-}300)}$, the value of which should be at least $7 \cdot 10^{-6} K^{-1}$ to $11 \cdot 10^{-6} K^{-1}$, so that joint connections comprising chromium alloys and also steels with a high chromium content are possible.

This object is achieved by the joining materials according to the claims appended herein below. Preferred embodiments become apparent from the dependent claims.

Unless stated otherwise, all percentages given herein below are figures in mol % on an oxide basis.

According to the invention, the glass-based joining materials, i.e. the vitreous or partially crystalline joining materials, have a coefficient of linear thermal expansion $\alpha_{(20\text{-}300)}$ of at least $7 \cdot 10^{-6} K^{-1}$. Advantageously, preferred embodiments of the glass-based joining material of the invention have coefficients of linear thermal expansion of at least $8 \cdot 10^{-6} K^{-1}$ to at least $10 \cdot 10^{-6} K^{-1}$.

The joining material according to the invention comprises more than 30%, up to 50%. $SiO_2$ and also 0.5% to 15% $B_2O_3$ as glass formers. Other glass formers, such as $As_2O_3$, $Sb_2O_3$, $V_2O_5$, $Bi_2O_5$, PbO and $GeO_2$, are present at most in traces in the joining materials on account of their polyvalence and/or the high raw material price. $P_2O_5$ is likewise present only in traces on account of its negative influence on the hydrolytic resistance.

$SiO_2$ is the preferred glass former since it is stable at high temperatures and also under reducing conditions. In order to ensure a sufficient resistance of the joining material at high temperatures, at least more than 30% $SiO_2$ must be present in the joining material according to the invention. At a value of more than 55%, the formation of cristobalite is possible, which experiences a phase transformation at temperatures between 200° C. and 300° C. The phase transformation manifests itself in a discontinuity in thermal expansion, which leads to increasing stresses during thermal cycling and, as a result of this, to leaks in the component.

In the composition according to the invention, $B_2O_3$ is an effective flux and is present in the joining material in order to achieve good meltability of the glass. Small proportions of boron oxide have a positive effect on the chemical resistance and also the crystallization behavior of the silicate glasses. Since boron oxide CaO react with water vapor at high temperatures to form volatile $B(OH)_3$, the maximum content of boron oxide in the joining material of the invention is 15%.

$Al_2O_3$ is optional in the joining material according to the invention and is present at most up to the upper limit of less than 1.7%. $Al_2O_3$ can increase the chemical resistance and also control the coefficient of thermal expansion, the viscosity, and the crystallization behavior. Larger quantities of $Al_2O_3$ have the disadvantage, however, that, in combination with other glass constituents, they have crystal phases with a negative effect on the expansion behavior of the glass ceramic. Thus, in magnesium aluminosilicate glasses, in the case of excessively high $Al_2O_3$ contents, cordierite ($Mg_2Al_4Si_5O_{18}$) with a very low coefficient of thermal expansion of 1 ppm/K can undesirably be formed. In barium and strontium aluminosilicate glasses, undesirable celsian phases ($BaSi_2Al_2O_8$) can form in the case of excessively high $Al_2O_3$ contents. These can have both a high coefficient of thermal expansion, of up to 12 ppm/K (hexacelsian), but also a very low coefficient of thermal expansion, of only 3 ppm/K.

The BaO proportion according to the invention in the joining material is 5% to 30% and that of CaO is 5% to 40%. It has been found that BaO and CaO are used best in combination, this arising as a result of the above-described minimum contents of these components. In addition, up to 20% MgO can optionally also be used. The combination of the alkaline earth metal oxides is used to set the crystallization behavior, the viscosity profile, and the coefficient of thermal expansion of the glass, and also of the crystallized glass ceramic.

The sum of the total content of BaO, CaO and MgO (ΣMgO+CaO+BaO) is preferably 35% to 45%. Relatively high BaO contents and low CaO contents in the joining materials can lead to excessive reactions with chromium constituents of joining partners. Therefore, it is also advantageous to limit the BaO proportion to at most 30%, in particular at most 25%. In combination with CaO, with the upper limit of at most 40 mol %, at least 5 mol % BaO is advisable as an additive in the glass, in order to achieve good flux of the glass during melting. A further positive effect of the alkaline earth metal oxides is that the dielectric loss can be reduced. Furthermore, the melting temperature and the glass transition temperature can be reduced by the network-modifying alkaline earth metal oxides. The presence thereof furthermore increases the coefficient of thermal expansion and therefore represents a simple possibility for adapting the joining material to the components to be fused. However, the use of SrO is advantageously dispensed with, apart from trace proportions which are introduced by the barium oxide. The joining material according to the invention is similarly advantageously free of PbO.

ZnO can optionally also be present, with a content of up to 5%.

In addition, further metal oxides $RO_2$ selected from the group consisting of $ZrO_2$, $TiO_2$ and/or $SnO_2$, can optionally also be present. The total content of $RO_2$ is at most 5%. These oxides can act in particular as nucleating agents for the partial crystallization desired in certain embodiments. Higher $RO_2$ contents can lead to increased crystallization and thereby shift the flux towards higher ternperatures.

Alkali metal oxides $R_2O$ selected from the group consisting of $Li_2O$ and/or $Na_2O$ and/or $K_2O$ are similarly optionally present with a total content of at most 2%. On account of their negative effect on the resistivity of the joint and also the acceleration of chromium vaporization reactions, alkali metal oxides $R_2O$ are to be limited to the maximum content stated.

$Cs_2O$ has a relatively low mobility in the glass compared to the aforementioned alkali metal oxides, but it is to be reduced to proportions of <5 mol % on account Of its negative effect on the chemical resistance.

$Y_2O_3$, with a content of 0% to 5%, and/or $La_2O_3$ can optionally also be present, the $La_2O_3$ content being limited, according to the invention, to less than 1%.

Further metal oxides $R_2O_3$ selected from the group consisting of $Nd_2O_3$ and/or $Pr_2O_3$ are of course not excluded, depending on the application. The total content of these components, referred to as $R_2O_3$, should not exceed 5% together with $Y_2O_3$ and $La_2O_3$, however.

$Y_2O_3$ and/or $La_2O_3$ and/or the $R_2O_3$ mentioned are able to control the crystallization behavior of the joining material during the soldering operation. At the same time, they can increase the glass formation temperature. The higher the glass formation temperature $T_g$, the higher the operating temperature of the joining material too.

However, the inventors have found that the content of $La_2O_3$ should be limited as described above, since it can react with $ZrO_2$, which can originate either from the glass phase or from the electrolyte during use. In this case, a separate lanthanum zirconate phase can form, which has, for example, undesirable coefficients of thermal expansion and would therefore weaken the joint produced with the joining material. In contrast thereto, a $Y_2O_3$ content is able to suppress the undesirable cordierite phase in a partially crystalline joining material. $La_2O_3$ is not able to do this.

Oxides of polyvalent transition metals, such as iron, cobalt and molybdenum, are not added in quantities going beyond traces.

Further additions are of course possible and are similarly encompassed by the invention. Within the context of the invention, the term "vitreous or partially crystalline joining material" encompasses both the amorphous base glass, which is used for example as soldering glass before the soldering operation, and the material arising from the base glass during the joining operation, which can be present as partially crystalline or completely crystallized material. It is the case so to speak that the glass-based joining material according to the invention is a glass solder with crystallization properties in the appropriate composition ranges indicated.

In a preferred embodiment, the joining material according to the invention comprises 35% to 50% $SiO_2$, 0.5% to 15% $B_2O_3$, 0% to less than 1.6% $Al_2O_3$, 5% to 25% BaO, 9% to 36% CaO, 0% to 16% MgO, 0% to 5% $RO_2$, in particular 0% to 5% or 0% to 4.5% $ZrO_2$, 0% to less than 2% $R_2O$, 0% to 4% $Y_2O_3$ and less than 0.2% $La_2O_3$.

Advantageous lower limits of $B_2O_3$ are in particular 3% and/or 4% and/or 5% and/or 6% and advantageous upper limits of $B_2O_3$ are in particular 13% and/or 14%. An advantageous upper limit of $Al_2O_3$ is 1.6% or in particular 1.5%. Advantageous lower limits of BaO are 6% and 7% and advantageous upper limits of BaO can also be in particular 24% and/or 23%. An expedient lower limit of CaO can also be in particular 10% and expedient upper limits of CaO can similarly be 36% and/or 35% and/or 34%. Expedient upper limits of MgO can also be in particular 15% and/or 14%.

Lower limits of $Y_2O_3$ of 0.1%, 0.5% and/or 1% can be particularly advantageous, in particular with an upper limit of 4%. As already described, the $La_2O_3$ content is limited, and therefore an expedient upper limit for $La_2O_3$ is also a content of less than 0.1%. The joining material is particularly advantageously free of $La_2O_3$, except for at most impurities.

All of the lower and upper limits stated can of course be combined with one another as desired. It is particularly advantageous that a joining material according to the invention consists of the components mentioned in the composition ranges mentioned. As is evident for the specimen skilled in the art, it could be also advantageous that the joining material according to the invention essentially consists of and/or consists of the named components.

In a particularly preferred embodiment, the joining material is present in a partially crystallized form and comprises, within the above-described content ranges, both $ZrO_2$ and $Y_2O_3$, with a content of in each case up to 5%, with $ZrO_2$:$Y_2O_3$ solid solutions similarly being present in the joining material. These solid solutions are formed by $ZrO_2$ and $Y_2O_3$ constituents, which are present. These can originate from the addition during the production of the joining material.

The inventors have established that the presence of these $ZrO_2$:$Y_2O_3$ mixed crystals can even have the effect that the strength of the joint connection is improved.

In a preferred embodiment, the joining material is mixed with inorganic fillers. The proportion of the latter can be up to 30% by weight in the total mass. Use is made in particular of inorganic fillers selected from the group consisting of $Al_2O_3$ and/or stabilized $ZrO_2$ and/or MgO, which can be present in particular in the form of particles and/or fibers. Primarily the thermal expansion and also the strength of the joining material can be set using the fillers.

After the joining operation, the joining material according to the invention can be present in particular as an amorphous glass which does not contain any crystalline regions, or in a partially crystalline state, in which at least crystallized regions can be found. This of course also includes completely crystallized joining materials.

In an advantageous embodiment, the joining material according to the invention is present as a partially crystallized glass ceramic after the joining operation, however, in which the crystalline proportion is at most 50% based on the total weight.

In the case of the partially crystalline joining materials, it is preferable that $CaSiO_3$ (wollastonite), $CaMgSi_2O_6$ (diopside) and also $BaCa_2Si_3O_9$ (walstromite) form as the crystal phase. The formation of tridymite can be avoided by the addition of CaO.

In the case of the partially crystalline embodiment, the composition of the joining material according to the invention is preferably set in such a way that it slowly crystallizes. If it were to already crystallize to a great extent, sufficient wetting is often not achieved. In particular, during the production of a joint connection, it should generally be possible for the joining material to be introduced into the join in an uncrystallized or partially crystallized form, since the temperature required for wetting the components to be fused is then lower.

The joining material according to the invention is distinguished by the fact that it has good flow properties in the initial state and sufficient crystallization, which CaO be controlled in particular by way of the temperature program, in a subsequent step, such that the joint connection can be used in applications at high temperatures, in particular above 800° C. The very good flow properties are reflected in very slow crystallization during the joining process, i.e. crystallization does not arise in the DSC measurement, or arises only at temperatures above the maximum joining temperature of 950° C.

The joining material according to the invention can also be interpreted as a primary product and/or intermediate product of the joint connection which is to be produced therewith. The joint connection which is produced therewith is therefore likewise the subject matter of the invention. The joining material according to the invention is suitable in particular for producing joint connections with metals and/or metal alloys and/or ceramics as joining partners.

A preferred joint connection according to the invention is accordingly a joint connection between two ceramics, which are joined to one another by means of a joining material according to the invention, or a joint connection between two metals and/or metal alloys, which are joined to one another by means of a joining material according to the invention, or a joint connection between a metal and/or a metal alloy and a ceramic, which are joined to one another by means of a joining material according to the invention. These elements can also be combined with further components or can be combined with one another as desired.

The joining material according to the invention is preferably used for producing joint connections with stabilized zirconium oxide, preferably with yttrium-stabilized zirconium oxide, abbreviated to YSZ (encompassing in particular 3YSZ, 4YSZ and/or 8YSZ), which are known to a person skilled in the art.

Joint connections with ferritic high-grade steels (e.g. Crofer 22) or chromium alloys (CFY. Cr5FeY), which are often used in SOFCs, can similarly preferably be produced. An example of the use in fuel cells is the joining of individual SOFCs to form an SOFC stack. Similarly, it is possible to use the joining material according to the invention to seal off through-openings in components, in particular made of said materials, including in fuel cells.

Therefore, the invention also encompasses the use of the joining material according to the invention for producing joint connections and/or feed-throughs, in particular in fuel cells, primarily high-temperature fuel cells, electrolysis cells, sensors and/or spark plugs.

Examples of sensors of this type can be found in combustion assemblies, for example automotive applications, marine engines, power plants, aircraft or in space technology. An advantageous application is the use of the joining material according to the invention in sensors in the exhaust gas system and/or the combustion chamber of vehicles or other appliances with internal combustion engines or other appliances including appliance zones which are exposed to high temperatures.

A further preferred use of the joining material according to the invention is the production of sintered bodies with a high temperature resistance. Processes for producing sintered bodies are sufficiently well known. In general, in this case the starting material of the joining material according to the invention is mixed with one another in powder form, combined with a generally organic binder and pressed into the desired shape. Instead of the powders of the starting materials, it is also possible for an already melted glass according to the invention to be ground and mixed with the binder. The pressed glass/binder body is then brought to sintering temperature, in which case the binder can burn out and the glass components can sinter together at the sintering temperature. The thus obtained sintered body can then be brought into contact with the components to be joined and can join these and/or can be joined thereto by a soldering operation.

The use of sintered bodies for the soldering has the advantage that the sintered body is a shaped component and can be given virtually any desired geometries. A shape used frequently, for example, is a hollow cylinder, which can be introduced into through-openings of metal components together with an electrical contact pin in order to obtain a preferably hermetically tight glass-metal feed-through with an electrically insulated contact pin by soldering. Glass-metal feed-throughs of this type are used in many electrical components and are known to a person skilled in the art.

A further preferred application of the joining material according to the invention is the production of sheets which contain the joining material. Sheets of this kind are similar to the sintered body described above, but can have a largely flexible configuration. Shapes can be punched out of said sheets and can advantageously be used to join areal components to one another.

The use as an aggregate in other glasses and/or glass ceramics is similarly possible.

The joining material according to the invention is generally produced by melting the contents in a conventional glass melt to form a glass and then grinding the latter to form a powder. The powder can be introduced into the joint connection, for example, in the form of a dispensable paste or of a presintered shaped body.

Optimum strengths of a joint connection are achieved if the joining material is optimally matched in terms of thermal expansion to the materials to be joined. Furthermore, no excessively large stresses may arise in the joining material even by virtue of a change in the coefficient of thermal expansion by the crystallization process. The joining material according to the invention ensures this, inter alia, by the avoidance of undesirable crystal phases.

EXAMPLES

The invention will be described in more detail herein below and illustrated by the composition and properties of examples of the joining materials according to the invention and a comparative example of a joining material.

Firstly, the joining material was melted in a glass melt. The compositions of 12 examples named no. 1 to no. 12 are shown in Table 1 hereinbelow, together with significant physical properties. The last column, with the header Comp. Ex., indicates the composition of the comparative example, which is not an example of the joining materials of the invention. As already described, all figures are in mol% on an oxide basis.

TABLE 1

JOINING MATERIALS OF THE INVENTION, A COMPARATIVE EXAMPLE AND PROPERTIES THEREOF

|  | No. 1 | No. 2 | No. 3 | No. 4 | No. 5 | No. 6 | No. 7 |
|---|---|---|---|---|---|---|---|
| $SiO_2$ | 47.00 | 44.50 | 42.50 | 42.50 | 42.50 | 38.18 | 49.99 |
| $Al_2O_3$ | 1.58 | 1.57 | 1.50 | 1.50 | 1.50 | — | 1.50 |
| CaO | 16.50 | 17.28 | 18.25 | 10.00 | 26.50 | 33.96 | 30.01 |
| $B_2O_3$ | 6.40 | 8.90 | 13.00 | 13.00 | 13.00 | 11.74 | 7.99 |
| MgO | 8.10 | 7.33 | 3.50 | 7.00 | 3.49 | — | — |
| $Y_2O_3$ | 3.14 | 3.14 | 3.00 | 3.00 | 3.00 | 3.39 | 3.50 |
| BaO | 17.28 | 17.28 | 18.25 | 23.00 | 10.00 | 7.19 | 7.00 |
| $ZrO_2$ | — | — | — | — | — | 4.06 | — |
| ZnO | — | — | — | — | — | 1.49 | — |
| $TiO_2$ | — | — | — | — | — | — | — |
| Σ(MgO, CaO, BaO) | 41.88 | 41.89 | 40.00 | 40.01 | 40.00 | 41.15 | 37.02 |
| Casting properties |  |  |  |  |  |  |  |
| α(20-300) [ppm/K] | 8.48 | 8.62 | 8.63 | 8.57 | 8.34 | 8.68 | 7.96 |
| Tg [° C.] | 681 | 669 | 656 | 640 | 657 | 663 | 683 |

TABLE 1-continued

JOINING MATERIALS OF THE INVENTION, A COMPARATIVE EXAMPLE
AND PROPERTIES THEREOF

Powder properties

| | | | | | | | |
|---|---|---|---|---|---|---|---|
| $T_g$ [° C.] | 702 | 689 | 675 | 671 | 683 | 697 | n.d. |
| Tx, onset [° C.] | — | — | — | — | — | 967 | n.d. |
| Tx, peak [° C.] | — | — | — | — | — | 1010 | 988 |
| Sintering onset [° C.] | 752 | 734 | 716 | 713 | 731 | 744 | 738 |
| Softening [° C.] | 815 | 772 | 845 | 848 | 779 | 776 | 867 |
| Sphere point [° C.] | 915 | 888 | 866 | 870 | 868 | 872 | 904 |
| HSP [° C.] | 973 | 935 | 909 | 919 | 907 | 930 | 954 |
| Flow temperature [° C.] | 1136 | 981 | 973 | 1057 | 957 | 1096 | 1168 |
| HSP – sphere [° C.] | 58 | 47 | 43 | 49 | 39 | 58 | 50 |

Glass ceramic properties

| | | | | | | | |
|---|---|---|---|---|---|---|---|
| α(20-300) [ppm/K] | 8.66 | 8.95 | 8.66 | 8.39 | 7.55 | 7.07 | 7.37 |
| $T_g$ [° C.] | 609 | 613 | 637 | 649 | 645 | 623 | 654 |
| Dilatometr. ST [° C.] | >800 | >800 | >800 | 706 | >800 | >800 | >1000 |

| | No. 8 | No. 9 | No. 10 | No. 11 | No. 12 | Comp. Ex. |
|---|---|---|---|---|---|---|
| $SiO_2$ | 40.00 | 42.00 | 45.50 | 45.50 | 45.50 | 42.50 |
| $Al_2O_3$ | — | — | 1.50 | — | — | 1.50 |
| CaO | 21.00 | 10.00 | 15.00 | 14.00 | 14.00 | — |
| $B_2O_3$ | 9.00 | 7.00 | 6.00 | 6.50 | 5.50 | 13.00 |
| MgO | — | 10.00 | 8.00 | 8.00 | 14.00 | 7.00 |
| $Y_2O_3$ | 4.00 | 4.00 | 3.00 | 3.00 | 1.00 | 3.00 |
| BaO | 22.00 | 23.00 | 19.00 | 21.00 | 14.00 | 33.00 |
| $ZrO_2$ | 4.00 | 4.00 | 2.00 | 2.00 | 3.00 | — |
| ZnO | — | — | — | — | — | — |
| $TiO_2$ | — | — | — | — | 3.00 | — |
| Σ(MgO, CaO, BaO) | 43.00 | 43.00 | 42.00 | 43.00 | 42.00 | — |

Casting properties

| | | | | | | |
|---|---|---|---|---|---|---|
| α(20-300) [ppm/K] | 9.29 | 8.82 | 8.5 | 8.82 | 7.99 | 9.02 |
| $T_g$ [° C.] | 686 | 696 | 685 | 677 | 690 | 642 |

Powder properties

| | | | | | | |
|---|---|---|---|---|---|---|
| $T_g$ [° C.] | 715 | 727 | 695.2 | 714.3 | 715.1 | |
| Tx, onset [° C.] | — | — | — | — | — | |
| Tx, peak [° C.] | — | — | — | — | 973.2 | |
| Sintering onset [° C.] | 750 | 763 | 759 | 750 | 736 | 679 |
| Softening [° C.] | 816 | 814 | 817 | 789 | 846 | 767 |
| Sphere point [° C.] | 910 | 923 | 926 | n.d. | 901 | 822 |
| HSP [° C.] | 1108 | 983 | 979 | n.d. | 1047 | 896 |
| Flow temperature [° C.] | 1118 | 1022 | 1036 | 998 | 1088 | 957 |
| HSP – sphere [° C.] | 198 | 60 | 53 | n.d. | 146 | 74 |

Glass ceramic properties

| | | | | | | |
|---|---|---|---|---|---|---|
| α(20-300) [ppm/K] | 9.38 | 8.78 | 8.79 | 9.04 | 8.52 | 9.16 |
| $T_g$ [° C.] | 608 | 695 | 682 | 643 | 684 | 641 |
| ST [° C.] | >800 | 780 | 766 | — | — | 709 |

At first, these exemplary joining materials were present in amorphous, i.e. vitreous, form. The properties of the joining materials indicated in Table 1 were measured. The abbreviations mean:

$T_g$ Glass transition temperature, or simply transition temperature $T_x$ Crystallization temperature $\alpha_{(20\text{-}300)}$ Coefficient of linear thermal expansion from 20° C. to 300° C.

ST Dilatometric softening temperature (at this temperature the logarithm of the viscosity is 7.6)

HSP Hemisphere point

The remaining terms used are common and known to a person skilled in the art. The glass transition temperature ($T_g$) and the coefficient of thermal expansion between 20 and 300° C. ($\alpha_{(20\text{-}300)}$) were determined by dilatometry on the cast block; the crystallization temperature $T_x$ was determined by DSC of the powder; the sintering onset, softening temperature, sphere point, hemisphere point and flow temperature were determined by heating microscopy on the powder compact. Since these are standard methods, the procedures are known to a person skilled in the art.

Then, the examples of the amorphous joining materials were at least partially crystallized by heat treatment. Since many high-melting constituents crystallize out of the glass matrix, the $T_g$ shifts towards slightly lower temperatures. As a result of the crystallization, the glasses are readily joinable, however, and subsequently well suited to operation at temperatures of more than 800° C.

A paste was prepared from the joining material according to example 1 in the above Table with an acrylate-based binder and an organic solvent and applied to the edge regions of two uncoated CFY (chromium-iron-yttrium) plates. The plates were laid onto one another and joined at a joining temperature of 950° C. After joining, the samples had a He impermeability of $10^{-8}$ to $10^{-9}$ mbar·l·s$^{-1}$. After ageing of these samples at 850° C. for 500 h and 1000 h, it was not possible to identify any change in the impermeability. This joining material is accordingly very well suited to joining with CFY.

The performance of this test with the joining material with the comparative example underlines the advantages of the invention.

For comparison, a paste was prepared from the joining material according to the comparative example with an acrylate-based binder and an organic solvent and applied to the edge regions of two uncoated CFY plates. The joining material of the comparative example has a high BaO content and a composition lying outside the range of the claims. The plates were laid onto one another and joined at 900° C. In the contact region between the glass and the metal, there was a considerable green discoloration on account of severe chromium dissolution and strong bubble formation. It was not possible produce an impermeable sample. Therefore, this glass is unsuitable for joining.

As another use example, small cylinders having a diameter of 2 mm were pressed from the joining material according to example no. 1 and fused with CFY at 950° C. The molten beads had very good adhesion on the substrate. To detach the samples, a very high mean force of 12.7 kg was required.

Here, too, the performance of this test with the joining material of the comparative example proves that the joining material according to the invention is superior to that of the comparative example. Small cylinders having a diameter of 2 mm were pressed from the joining material of the comparative example and fused with CFY at 900° C. The molten beads had no adhesion on the substrate.

The joining material according to the invention can be produced by conventional melting processes with good melting properties and not excessively high melting temperatures. It has a thermal expansion in the desired range and also in particular a tendency towards crystallization which can be controlled as required. The composition effectively prevents the formation of undesirable crystal phases, which makes it possible to achieve permanently stable, low-stress joint connections. On account of the low content or absence of alkali metals, the glass solders according to the invention have outstanding electrical insulation properties, even at high temperatures.

Furthermore, the good wetting in particular of the interconnector materials in fuel cells makes it possible to efficiently produce joint connections in fuel cell stacks. The very good flow behavior is reflected in very slow crystallization during the joining process, i.e. in the DSC measurement, no crystallization arises or crystallization arises only at temperatures above the maximum joining temperature of 950° C.

The joining material according to the invention makes it possible, in a particularly advantageous manner, to produce joint connections with ferritic high-grade steels (e.g. Crofer 22) and/or chromium-containing alloys (e.g. CFY and/or Cr5FeY) and/or ceramic joining partners such as stabilized zirconium oxide and/or aluminium oxide.

While the invention has been illustrated and described as embodied in a vitreous, or a partially crystalline, joining material and uses of same, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. A vitreous or a partially crystalline joining material having a coefficient of thermal expansion $\alpha_{(20-300)}$ of $\geq 7 \cdot 10^{-6}$ $K^{-1}$, said joining material comprising, in mol % on an oxide basis:

| | |
|---|---|
| $SiO_2$ | >30-55 |
| $B_2O_3$ | 0.5-15 |
| $Al_2O_3$ | 0-<1.7 |
| BaO | 5-30 |
| CaO | 5-40 |
| MgO | 0-20 |
| ZnO | 0-5 |
| $Cs_2O$ | 0-<5 |
| $RO_2$ | 0-5 |
| $R_2O$ | 0-2 |
| $Y_2O_3$ | 0.1-4 |
| $La_2O_3$ | <1, | wherein $RO_2$ is a metal oxide or a mixture of metal oxides selected from the group consisting of $ZrO_2$, $TiO_2$ and $SnO_2$, and wherein $R_2O$ is an alkali metal oxide or a mixture of alkali metal oxides selected from the group consisting of $Li_2O$, $Na_2O$ and $K_2O$.

2. The joining material according to claim 1, comprising, in mol % on an oxide basis:

| | |
|---|---|
| $SiO_2$ | 35-50 |
| $B_2O_3$ | 0.5-15 |
| $Al_2O_3$ | 0-<1.6 |
| BaO | 5-25 |
| CaO | 9-36 |
| MgO | 0-16 |
| $RO_2$ | 0-5 |
| $R_2O$ | 0-<2 |
| $Y_2O_3$ | 0.1-4 |
| $La_2O_3$ | <0.2. |

3. The joining material according to claim 1, which contains 35 to 45 mol % of a sum total amount of MgO+CaO+BaO.

4. The joining material according to claim 1, which contains both $ZrO_2$ and $Y_2O_3$, each in respective amounts up to 5 mol %, and which contains $ZrO_2$:$Y_2O_3$ solid solutions.

5. The joining material according to claim 1, further comprising at least one inorganic filler in an amount of up to 30% by weight.

6. The joining material according to claim 5, wherein said at least one inorganic filler is selected from the group consisting of $Al_2O_3$, stabilized $ZrO_2$ and MgO, which are present in particular in the form of particles or fibers.

7. The joining material according to claim 1, which is present in an amorphous or vitreous state.

8. The joining material according to claim 1, having a crystalline phase and wherein the crystalline phase does not contain any tridymite.

9. A joint connection, comprising at least
two elements, which are each made of a ceramic material and which are joined by a joining material according to claim 1; or
two elements, which are each made of at least one material selected from the group consisting of metals and metal alloys and which are joined by a joining material according to claim 1; or
one element made of a ceramic material and another element made of at least one material selected from the group consisting of metals and metal alloys, said one element and said another element being joined by a joining material according to claim 1.

10. A joint connection, in particular in a fuel cell, an electrolysis cell, a sensor, or a spark plug, said joint connection comprising a joining material according to claim 1.

11. A glass-metal feed-through device, in particular for a fuel cell, an electrolysis cell, a sensor, or a spark plug, said feed-through device comprising a sintered body, wherein said sintered body is made from a joining material according to claim 1.

12. A joint connection, comprising
a plurality of ceramic elements, said ceramic elements being made of a material selected from the group consisting of stabilized zirconium oxide and aluminium oxide; and
a joining material according to claim 1.

13. A joint connection, comprising
a plurality of metal elements, said metal elements being made of at least one material selected from the group consisting of ferritic high-grade steels and chromium-containing alloys; and
a joining material according to claim 1.

14. A joint connection, comprising
a plurality of metal elements, said metal elements being made of a chromium-iron-yttrium alloy; and
a joining material according to claim 1.

15. A glass or glass ceramic comprising a joining material according to claim 1 as an aggregate.

16. A sintered body or green sheet comprising a joining material according to claim 1.

* * * * *